June 11, 1929.  W. H. MacMENIGALL  1,717,236
MEANS FOR THE MANUFACTURE OF PIPES OR TUBES
FROM FIBER AND CEMENTITIOUS MATERIAL
Filed April 29, 1927    2 Sheets-Sheet 2
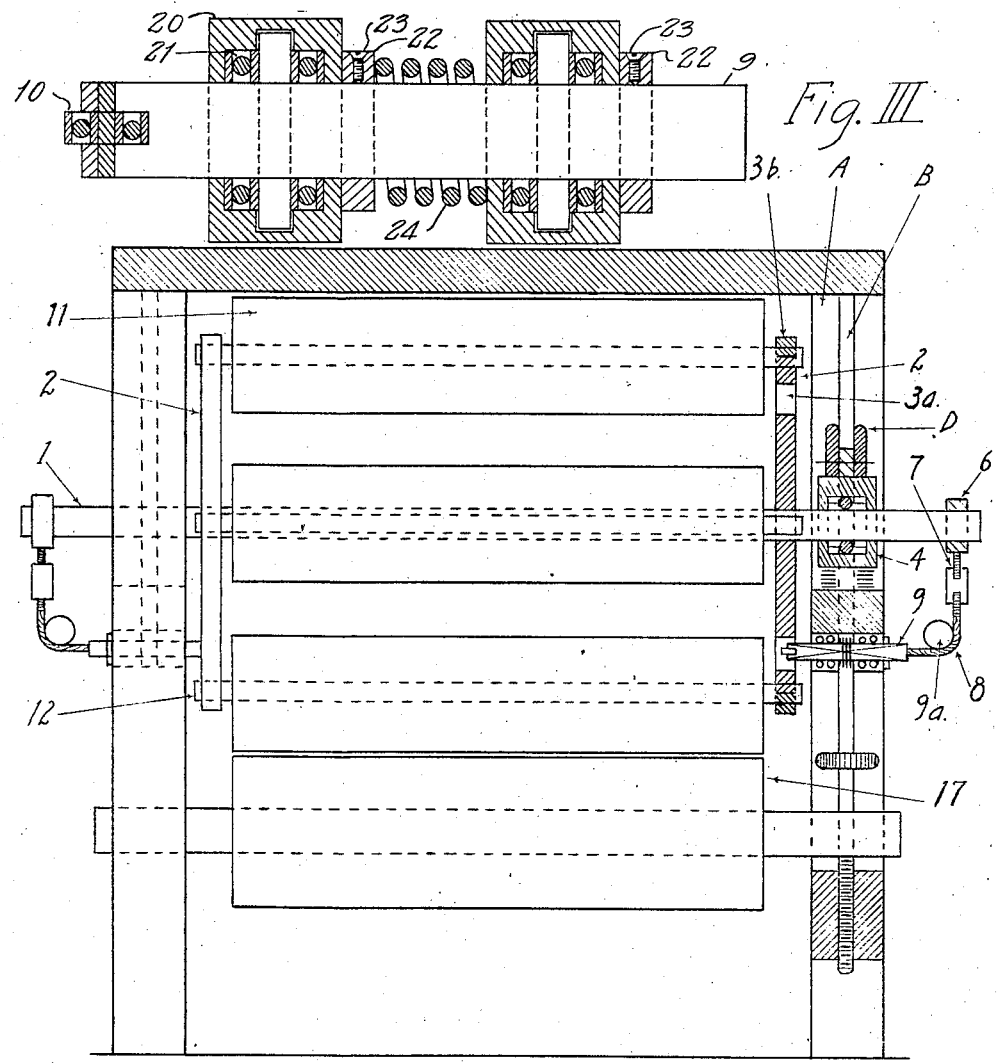
Fig. III
Fig. II Patented June 11, 1929.

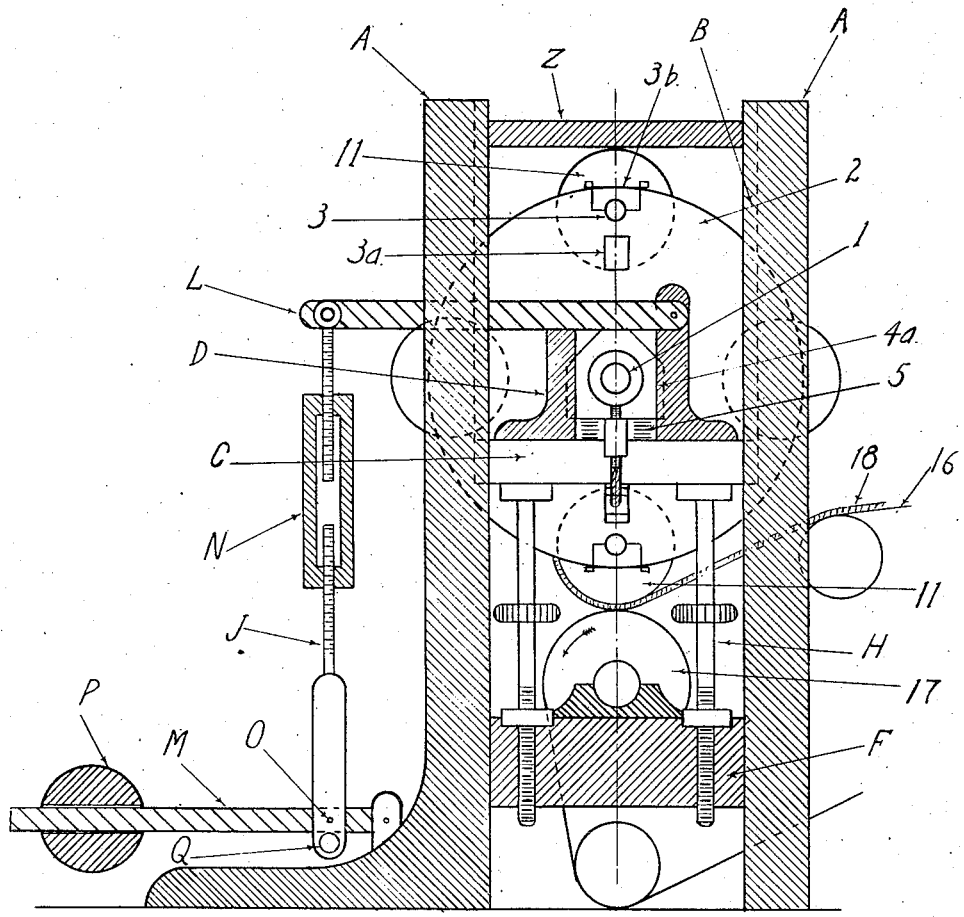
Fig. I

1,717,236

UNITED STATES PATENT OFFICE.

WILLIAM HAMILTON MacMENIGALL, OF JACOBS, NATAL, SOUTH AFRICA, ASSIGNOR TO JOHN STANLEY HANCOCK, OF JOHANNESBURG, SOUTH AFRICA.

MEANS FOR THE MANUFACTURE OF PIPES OR TUBES FROM FIBER AND CEMENTITIOUS MATERIAL.

Application filed April 29, 1927. Serial No. 187,662.

This invention relates to the manufacture of pipes or cylinders from a mixture of fiber and cementitious material and has for its object the provision of mechanism to be used in conjunction with any sheet forming machine, used in the asbestos paper or pulp industry.

The invention will be described with particular reference to asbestos cement.

Machines are known in which pulp, paper or similar material is applied under pressure to a forming mandril or cylinder and for removing the mandril from contact with the wet sheet when the material on the mandril has attained a predetermined thickness, but in every case the machine is comparatively complicated and has to have independent means for driving it. Moreover, such machines have not been adjustable, so as to enable pipes of various diameter to be dealt with.

According to the present invention a plurality of mandrils are carried circumferentially round a supporting shaft, the height of which from the ground is adjustable, and to each mandril in turn is applied a wet sheet of asbestos cement, or the like, under pressure, the mandril revolving on its axis, until a sufficient thickness of material has been applied, when it is automatically moved out of contact with the asbestos cement sheet and a new mandril brought into position by means of the momentum imparted to it by the action of the sheet forming machine combined with the action of gravity. The mandril is then removed from the machine and a fresh one inserted in its place so that the operations continue without intermission.

A particular form of the mechanism will be described, but the invention is not limited to the details set out.

Fig. I shows a side elevation of the machine.

Fig. II shows a front view partly in section.

Fig. III shows a detail of the mechanism whereby the discs are held and released.

A main shaft 1 extending over the full width of the machine carries at each end and rigidly fixed to it a disc 2 of substantially circular shape and of comparatively large diameter relative to the main shaft.

In the periphery of each disc 2 are four equally spaced radial slots 3, said slots in one disc registering with the slots in the other disc. The slots may be fitted with ball or roller bearings. The shaft is mounted in bearings 4 which seat on a series of compression springs 5 and the shaft is adapted to be forced downwards by means of levers L, J, M and weight P. The fulcrum at O is movable by means of a ball or roller bearing Q bearing on the under side of the arm M, but may be fixed by inserting a pin through the hole O. The length of the arm J can be adjusted as at N.

The main bearings 4 are tongued at the sides at 4ª these tongues fitting into grooves in a housing D so as to allow for vertical movement of bearing 4, and the housing D is supported by a cross bar C which is also capable of vertical movement between vertical supports A, stiffened at the top by a cross member Z, and at the bottom by a cross member F. Said vertical supports A have grooves B in which the cross bar C can slide.

The position of the cross bar C can be regulated by means of jacks H positioned on the cross piece F.

Round each end of the shaft 1 is a collar 6 attached by an adjustable rod 7 to a flexible wire 8 passing over a pulley 9ª. Said wire 8 is attached to a square bar 9 forming a stop fitted with a frictionless bearing 10, adapted to fit into the slots 3ª in the discs 2.

The bar 9 is supported in clips 20 secured to the vertical supports A by ball bearings 21 and between the ball bearings and adjustably secured by collars 22 and grubscrews 23 is a compression spring 24.

The mandrils are prevented from falling out of the slots 3 by keepers 3ᵇ.

Below the mandril 11 is the wet felt 16 and positively driven roller 17 of a sheet forming machine and the mandril 11 is forced into close contact with the sheet 18 by means of the levers previously referred to.

The operation of the machine is as follows.

Four empty mandrils are supported between the discs 2 by shafts 12 the ends of which fit into the slots 3 and are retained by keepers 3ᵇ.

The stop 9 and bearing 10 holding the housing 2 stationary are engaged with the bottom slot 3ª and on actuating the clutch of the sheet forming machine the felt 16 takes up a uniform layer of asbestos and cement 18 which is carried forward to the mandril 11, which is caused to revolve by the pressure between it and the felt 16 and layer 18. The mandril 11 takes up the said layer 18 from the felt 16 and the process continues until, when there is a sufficient depth of material on the mandril 11, the discs 2 are raised with the main shaft 1, and the bearings 4. The main shaft 1 raises the collar 6 which gradually withdraws the stop 9 until it disengages the slot 3ª.

The discs 2 are carried forward in a clockwise direction with reference to Fig. I due to being given an initial impetus by the roller 17. The keepers 3ᵇ having been removed as soon as the mandril came into position over the roller 17, the mandril with the finished pipe on its drops out onto a suitable table (not shown).

Gravity now acts owing to the fact that there are two mandrils on the right hand side of the vertical diameter and only one on the other side so that the discs continue their clockwise rotation, the bearings 10 rolling over the faces of the discs 2 until they engage with the next two slots 3ª, when a fresh mandril is inserted in place of the one removed and the operation continues.

As soon as the mandril 11 moves out of position over the roller 17 the discs 2 fall back, the momentum being taken by the springs 5 but the lever bar L is stopped by the housing D from exerting any final pressure on the springs 5 and bearings 4.

At the initial raising of the bearings 4 due to the application of material to the mandril 11 the lever bar L is forced upwardly, causing intense pressure, but, as the fulcrum, in the form of the ball bearing Q, travels along the bar M, the pressure is gradually reduced as the thickness of the material on the mandril 11 increases.

I claim:

1. Means for manufacturing pipes or tubes of fiber and cementitious material comprising a main shaft mounted in bearings capable of vertical movement, a system of levers in conjunction with a bar carrying a weight, being adapted to apply downward pressure to said bearings, the fulcrum on said bar being automatically movable so as to reduce the pressure as said bar is raised.

2. An apparatus for manufacturing tubular articles comprising a frame, a driven roller mounted in the frame, a rotatable support on the frame slidably mounted to and from said roller, a plurality of mandrils rotatably mounted in support and positioned to be moved successively opposite said roller, means for feeding material to said roller, means for urging said support toward the roller in contact with said material, whereby said material will be wound about the mandril opposite the roller, means operable to normally lock said support against rotation when a mandril is opposite said roller, and means actuated by a predetermined movement of a mandril away from the roller to release said locking means.

3. An apparatus for manufacturing tubular articles comprising a frame, a driven roller mounted in the frame, a free rotatable support on the frame slidably mounted to and from said roller, a plurality of mandrils rotatably mounted in support and positioned to be moved successively opposite said roller, means for feeding material to said roller, means for urging said support toward the roller in contact with said material, whereby said material will be wound about the mandril opposite the roller, means operable to normally lock said support against rotation when a mandril is opposite said roller, means actuated by a predetermined movement of a mandril away from the roller to release said locking means, whereby momentum is imparted to said support by the influence of the roller on the mandril opposite the same to rotate said support and move the next mandril opposite the roller.

4. An apparatus for manufacturing tubular articles comprising a frame, a driven roller mounted in the frame, a rotatable support on the frame slidably mounted to and from said roller, a plurality of mandrils rotatably mounted in support and positioned to be moved successively opposite said roller, means for feeding material to said roller, means for urging said support toward the roller in contact with said material, whereby said material will be wound about the mandril opposite the roller, a detent mounted on the frame and normally urged to locking position, means on the support engageable with said detent, whereby the support is normally locked against rotation when a mandril is opposite said roller, a connection between said support and said detent whereby movement of the support away from said roller will withdraw the detent from locking position.

5. Means for manufacturing pipes or tubes of fiber and cementitious material comprising a driven roller, rotatable discs slidably mounted to move toward and away from said roller and peripheral slots in said discs, mandrils having the ends thereof received in said slots and positioned in said discs to be successively positioned opposite said roller, means for holding the discs against rotation when a mandril is opposite said roller, a conveyor belt for feeding material to said roller, means whereby said positioned mandril is forced into contact with said material on the belt, mechanical means whereby, when the material on said mandril has attained a predetermined thickness the movable discs are automatically released from said holding means and rotated under the influence of the momentum imparted to the mandril by the said positively driven roller, releasable means for holding said mandrils in said slots in said discs, whereby the mandril with the finished pipe upon it may be permitted to fall from said discs which then continue to revolve under the action of gravity, and means actuating said holding means whereby, as soon as a new mandril has come into position, the discs are again automatically held against rotation.

6. Means for manufacturing pipes or tubes of fiber and cementitious material comprising mandrils, vertically slidable rotatable discs between which said mandrils are carried, peripheral slots in said discs adapted to receive the shafts of said mandrils, removable clips on said slots adapted to prevent empty mandrils from falling therefrom, a driven roller positioned to have said mandrils brought successively opposite and over the same, detent engageable means on said discs, a detent normally urged in engagement with said last means for holding the discs stationary when a mandril is opposite the roller, means for supplying material to the mandril opposite said roller, means actuated by the vertical movement of said disc for withdrawing said detent when the material on the mandril has attained a predetermined thickness between said roller and mandril, thus allowing the discs to move round under the influence of the momentum imparted by the said driven roller, to move the mandril with the finished pipe thereon from opposite the roller, for allowing removal from said clips on the discs which then continue to revolve under the action of gravity until said detent engages the next detent engaging means on the face of a disc.

7. Means for manufacturing pipes or tubes of cementitious material comprising a main shaft mounted in bearings capable of vertical movement, a system of levers in conjunction with a bar carrying a weight, being adapted to apply downward pressure to said bearings, the fulcrum on said bar being automatically movable so as to reduce the pressure as said bar is raised.

Signed at Johannesburg, Transvaal S. A. this 16th day of March, 1927.

WILLIAM HAMILTON MacMENIGALL.